US009453156B2

(12) United States Patent
Wu

(10) Patent No.: US 9,453,156 B2
(45) Date of Patent: Sep. 27, 2016

(54) THERMOPLASTIC CELLULOSIC FIBER BLENDS AS LOST CIRCULATION MATERIALS

(75) Inventor: Qinglin Wu, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 1039 days.

(21) Appl. No.: 13/058,136

(22) PCT Filed: Aug. 11, 2009

(86) PCT No.: PCT/US2009/053346
§ 371 (c)(1),
(2), (4) Date: Jul. 29, 2011

(87) PCT Pub. No.: WO2010/019535
PCT Pub. Date: Feb. 18, 2010

(65) Prior Publication Data
US 2012/0108472 A1 May 3, 2012

Related U.S. Application Data

(60) Provisional application No. 61/088,222, filed on Aug. 12, 2008.

(51) Int. Cl.
| *C09K 8/035* | (2006.01) |
| *C09K 8/487* | (2006.01) |
| *C09K 8/40* | (2006.01) |
| *C09K 8/58* | (2006.01) |
| *C09K 8/50* | (2006.01) |
| *C04B 18/02* | (2006.01) |
| *C09K 8/514* | (2006.01) |
| *C09K 8/516* | (2006.01) |
| *C04B 103/46* | (2006.01) |

(52) U.S. Cl.
CPC ............ *C09K 8/501* (2013.01); *C04B 18/022* (2013.01); *C09K 8/035* (2013.01); *C09K 8/487* (2013.01); *C09K 8/514* (2013.01); *C09K 8/516* (2013.01); *C04B 2103/46* (2013.01); *C09K 2208/08* (2013.01); *C09K 2208/18* (2013.01); *Y02W 30/97* (2015.05)

(58) Field of Classification Search
None
See application file for complete search history.

(56) References Cited

U.S. PATENT DOCUMENTS

| 2,912,380 | A | * | 11/1959 | Groves | 507/112 |
| 3,375,888 | A | | 4/1968 | Lummus et al. | 166/294 |
| 3,496,902 | A | | 2/1970 | Cleary et al. | |
| 3,574,099 | A | | 4/1971 | Ryals et al. | 507/104 |
| 3,629,102 | A | | 12/1971 | Lummus et al. | 252/8.5 |
| 4,422,948 | A | | 12/1983 | Corley et al. | 507/104 |
| 4,526,240 | A | | 7/1985 | McKinley et al. | 175/72 |
| 4,579,668 | A | * | 4/1986 | Messenger | 507/118 |
| 4,629,575 | A | | 12/1986 | Weibel | |
| 5,691,281 | A | * | 11/1997 | Ashjian et al. | 507/103 |
| 5,826,669 | A | | 10/1998 | Zaleski et al. | 175/72 |
| 6,169,134 | B1 | * | 1/2001 | Jones et al. | 524/476 |
| 7,229,492 | B2 | | 6/2007 | Chatterji et al. | 106/724 |
| 7,284,611 | B2 | | 10/2007 | Reddy et al. | 166/295 |
| 7,612,021 | B2 | * | 11/2009 | Chatterji et al. | 507/204 |
| 2002/0147113 | A1 | * | 10/2002 | Green | 507/104 |
| 2005/0170973 | A1 | | 8/2005 | Verret | |
| 2006/0079408 | A1 | | 4/2006 | Verrett | 507/219 |
| 2006/0096759 | A1 | | 5/2006 | Reddy et al. | 166/295 |
| 2007/0244013 | A1 | | 10/2007 | Hoskins | 507/117 |
| 2008/0113879 | A1 | | 5/2008 | Way et al. | 507/117 |
| 2009/0054269 | A1 | | 2/2009 | Chatterji et al. | 507/104 |

FOREIGN PATENT DOCUMENTS

| EP | 2179000 A1 | 4/2010 |
| WO | WO / 2006-040578 | 4/2006 |

OTHER PUBLICATIONS

Benedict, L., "LSU AgCenter's 'hole-plugging' technology creates new business, jobs for Louisiana," Press Release (Aug. 4, 2009), available at: http://text.lsuagcenter.com/news_archive/2009/august/headline_news/LSU+AgCenters+holeplugging+technology+creates+new+business+jobs+for+Louisiana.htm.
Office Action to European Application No. 09807146.7 dated Jan. 22, 2014, 8 pages.
Griggs, Ted, "LSU AgCenter Researching Wood-Plastics Materials," The Advocate and WBRZ News 2 Louisiana, Published Jan. 7, 2007.
Griggs, Ted, "Unbottling Waste," The Advocate and WBRZ News 2 Louisiana, Published Mar. 31, 2008.
Griggs, Ted et al., "Oil Drilling to Use LSU Process," The Advocate and WBRZ News 2 Louisiana, Published Aug. 5, 2009.

* cited by examiner

*Primary Examiner* — Jeffrey Washville
(74) *Attorney, Agent, or Firm* — John H. Runnels

(57) ABSTRACT

A method is disclosed for reducing lost circulation in drilling wells, employing composite materials as lost circulation materials. The composites comprise a thermoplastic polymer and cellulosic fibers. Optionally the composites may include other components such as calcium carbonate, clay, oil and other blending agents.

17 Claims, No Drawings

THERMOPLASTIC CELLULOSIC FIBER BLENDS AS LOST CIRCULATION MATERIALS

This is the United States national stage of international application PCT/US2009/053346, international filing date Aug. 11, 2009, which claims the benefit of the Aug. 12, 2008 filing date of U.S. provisional patent application Ser. No. 61/088,222 under 35 U.S.C. §119(e).

The development of this invention was partially funded by the U.S. Government under grant 68-3A75-6-508 awarded by the Department of Agriculture. The United States Government has certain rights in this invention.

TECHNICAL FIELD

This invention pertains to lost circulation materials, particularly to lost circulation materials that comprise thermoplastic and cellulosic-fiber blend composites.

BACKGROUND ART

Drilling fluids, often referred to as drilling muds in the oil industry, are used in well drilling operations. The drilling fluid, which may be a water-, oil-, or synthetic-based formulation, circulates within the well bore, carries cuttings to the surface, lubricates the drilling equipment, and acts as a cooling agent. So-called "lost circulation" occurs when drilling fluids or muds enter into a porous or fractured formation, and are lost to the drilling operation rather than returning to the surface for recycling and reuse. Lost circulation is a significant industry problem. It is estimated that lost circulation costs the industry about $800 million per year in the United States alone, and that the lost circulation products could represent as much as an additional $200 million annually. Lost circulation can lead to failures in testing wells, and can also lead to decreased productivity.

A variety of "lost circulation materials" have been employed to try to reduce levels of lost circulation. These "lost circulation materials" have included such things as coarse cellulosic fibers, fine cellulosic fibers, coarse nut shells, synthetic graphite, cellulose derivatives, mineral fibers, fine calcium carbonate (e.g., 1 mm in diameter), medium-sized calcium carbonate (e.g., 2 mm in diameter), and coarse calcium carbonate (e.g., 3 mm in diameter). Lost circulation materials often include different particle types and sizes to address different sizes of fracture. If part of the material is rigid but compressible or expandable under pressure, the material can perhaps mold itself into the fractures to help seal leaks. Cellulosic fibers alone will often lack the needed rigidity. To compensate for the lower rigidity, a greater concentration of the material may be required to effectively inhibit lost circulation. Due to the low density of cellulose, cellulosic fibers are often pelletized when used as lost circulation materials to reduce transportation, storage, and handling costs. Cellulosic materials can be subject to decay, mold, and insect (e.g., termites) degradation during storage. Inelastic materials such as waste plastics and rubber used in the lost circulation materials typically do not have the swelling/expansion properties that are needed to better plug cracks and fissures. Resilient graphitic carbon (RGC) of various sizes has been used in lost circulation compositions due to its resilience, but RGC can be expensive.

U.S. Patent Application publication no. 2006/0096759 discloses a lost circulation composition with a first portion of particles having a weight mean particle size of less than about 20 microns, a second portion of particles having a weight mean particle size in the range from about 25 microns to about 400 microns, and a third portion of particles having a weight mean particle size in the range of from about 450 microns to about 1,500 microns.

U.S. Pat. No. 4,422,948 discloses a lost circulation material comprising a mixture of flexible flakes, fibers, and granular particles made of shredded paper, mineral wool, and calcium carbonate.

U.S. Pat. No. 7,229,492 discloses a well cement composition comprising a hydraulic cement, water, and inelastic lost circulation material particles made of granulated waste materials such as polyethylene, polystyrene, or polypropylene.

U.S. Pat. No. 3,375,888 discloses a three-component lost circulation material comprising nutshells, shredded carpet, and lacquered regenerated cellulose.

U.S. Pat. No. 3,574,099 discloses the use of nutshells and asbestos fibers as lost circulation material.

U.S. Pat. No. 4,526,240 discloses the use a lost circulation material containing a hydrophilic absorbent composite comprising a fibrous absorbent and a water-swellable hydrophilic polymer absorbent. A compacted, fibrous material such as layered tissue or paper laminate, is mechanically shredded to form a loose, soft mass of fibers ("fluff"), which is combined with a swellable polymer for lost circulation control.

U.S. Pat. No. 3,629,102 discloses a three-component mixture of coarse nutshells, fine nutshells, and sugar cane fibers as a lost circulation material.

U.S. Pat. No. 4,579,668 describes a two-component lost circulation material derived from discarded wet-cell battery casings. The first component is a thermoplastic polymer in a flexible, elongated form, and the second component is a granular thermoset plastic with a specific gravity in the range 1.2-1.4.

U.S. Pat. No. 5,826,669 discloses the use of resilient graphitic materials for fluid loss and lubrication purposes.

U.S. Patent Application publication no. 2008/0113879 discloses the use of plastic granules (e.g., polypropylene) as lost circulation additives in drilling fluid.

U.S. Patent Application No. 2009/0054269 A1 discloses the use of what were called "composite particles" containing a cellulosic fiber and a filler as a lost circulation material. Examples of cellulosic fibers included fibers from trees and plants, sugar beet, sugarcane, citrus pulp, potatoes, grains, peanut hulls, corn cobs, tobacco stems, apple pumice, natural grasses, cotton, and peat. Examples of fillers included kaolin clay, calcium carbonate, barites, titanium dioxide, and ground thermoset polymer laminates. For example, in a "composite particulate" comprising a cellulosic fiber and a filler, the cellulosic fiber could be paper fiber, and the filler could be a ground laminate containing paper or fabric and melamine resin.

There is an unfilled need for improved, effective, and economical compositions and methods for reducing lost circulation in wells.

DISCLOSURE OF THE INVENTION

I have discovered a novel method for reducing lost circulation in drilling wells. The novel method employs composite materials as lost circulation materials. The materials are economical, and seal fissures and cracks more rapidly, more efficiently, and at higher temperatures than is typical of most commercially-available lost circulation materials.

The composites employed in the novel method comprise a thermoplastic polymer and cellulosic fibers. It is important that the polymer and fiber are combined into a composite material, and are not just a simple mixture. A "composite" is an engineered, solid-phase material made from two or more constituent materials with significantly different physical or chemical properties, in which the constituents remain separate and distinct on a macroscopic level within the finished, solid-phase structure. Optionally, the composites may also include additional components. Preferred embodiments comprise extruded blends of cellulosic fibers, a thermoplastic polymer matrix, calcium carbonate, and clay. The calcium carbonate can increase the density of the materials as well as adding rigidity. Optionally the composites may also include oil and other blending (or bonding) agents to modify performance characteristics (e.g., rigidity, swelling, and lubrication) or material handling properties. The thermoplastic cellulosic-fiber blend (TCB) composite may, for example, be made in pellets or in particulate forms of various sizes to suit different fracture sizes (e.g., 1 to 5,000 microns) through extrusion, grinding of extruded materials, and other techniques otherwise known in the art for forming composites. The Young's modulus of the particles is preferably from ~0.5 to ~3.0 GPa; more preferably the particles comprise a mixture of particles having a range of Young's moduli throughout the range from ~0.5 to ~10.0 GPa, which imparts a progressive deformability to the mixture to accommodate the opening and closing of fractures under varying conditions. It is preferred that the material only be mixed with water, aqueous mixtures, aqueous slurries, or aqueous muds shortly before being pumped into a well bore as part of the drilling fluid. In the fractured formations, the particles can settle down, absorb water, and swell in size while maintaining rigidity. The swelling property (especially from the cellulosic fibers) helps lock the particles into the fractured formation and seal the fractures against drilling fluid leakage. The optional oil component tends to leach out once the material is in contact with water. The leached oil helps reduce the abrasiveness of the material, and makes it suitable for use in drilling lubricants; it may even replace more expensive lubricant materials such as glass beads. The composition may optionally be made using plastics having different melting temperatures to suit a variety of different formations. The composites have superior properties over the properties of a simple mixture (see Tables 3 and 4 below). Size distribution of lost circulation materials should be tailored to the properties of the particular formation. Use of a composite material allows one more readily to control the size distribution of the particles than with mixtures of the individual components, which in general will vary more unless special efforts are taken with material handling (at increased expense).

The thermoplastic polymer forms a matrix to bind the other components into composite particles. The thermoplastic polymer may be any of the various thermoplastic materials known in the art, virgin or recycled, common or engineering polymer; including by way of example acrylonitrile butadiene styrene (ABS), polymethylmethacrylate (PMMA), acrylonitrile (AN), polytetrafluoroethylene (PTFE), polyvinylidene fluoride (PVDF), nylon 6, nylon 66, polycarbonate (PC), polybutylene terephthalate (PBT), polyethylene terephthalate (PET), polyetheretherketone (PEEK), polyetherimide (PEI), low density polyethylene (LDPE), high density polyethylene (HDPE), polyimide (PI), polyphenylene oxide (PPO), polyphenylene sulfide (PPS), polypropylene (PP), polystyrene (PS), polysulfone (PSO), polyethersulfone (PES), polyvinyl chloride (PVC), starch-based plastics, polylactic acid (PLA) plastics, poly-3-hydroxybutyrate (PHB), polyamide 11 (PA 11), bio-derived polyethylene, and mixtures of any the above with one another or with other polymers. One function of the thermoplastic material is to provide a matrix material for cellulosic fibers and other additives. For economic and environmental considerations, it is often preferred to use recycled materials such as discarded, HDPE-based motor oil containers. Prior to preparing the composite, it is generally preferred that the thermoplastic be in powder, pellet, or particulate form. If not already in such a form, the recycled polymers may be ground using standard polymer grinders known in the art. Depending on the characteristics of the formation in which the lost circulation material will be used, it will often be preferred to employ a mixture of both "common" plastics (melting temperatures less than 200° C.) and "engineering plastics" (melting temperature around 250-270° C.) to extend the useful temperature range of the material. Where more than one type of polymer is employed, they may be mixed as melts, or they may be co-extruded. The thermoplastic may comprise from about 10% to about 90% of the total lost circulation material by mass.

The cellulosic fiber portion of the lost circulation material may comprise any cellulosic materials, including for example fibers or particles from softwood (e.g., southern pine), hardwood (e.g., maple), bamboo, rattan, rice straw, wheat straw, rice husk, bagasse, cotton stalk, jute, hemp, flax, kenaf, milkweed, grass, and banana trees. The fibers provide rigidity, strength, stiffness, and swelling properties to the composition. The material should be in the particulate, flake, or shaving form. The cellulosic fiber may comprise from about 10% to about 80% of the total lost circulation material by mass.

The lost circulation material may also comprise oyster shell, other forms of calcium carbonate, mica, talc, ceramics, other minerals, and mixtures of one or more of the above with each other or with other components. These additives can provide additional strength and stiffness to the composition, or impart other useful properties. One such useful property is to increase the density of the material so that the composition will settle more easily in water. Calcium carbonate is a preferred additive for these purposes. Calcium carbonate is available from many sources. An economical source of calcium carbonate is precipitated calcium carbonate (PCC) from sugar mills or sugar refineries. The PCCs of sugar origin, commonly known as lime scum or carbonate slurry, are inorganic precipitates resulting from the purification of beet or cane juices by liming and subsequent carbonation. The PCCs of sugar origin typically have a powdery appearance with grayish hues. They readily agglomerate into lumps. PCCs are generated in enormous quantities as a byproduct of the sugar industry; currently PCC is used as a filling material for gravel mines, waste heaps, and the like; and in some cases it has been used for the correction of soils with excessively clay-like textures or to raise the soil pH. The PCC particle size typically varies from 10-3000 microns, although the size is not critical. The calcium carbonate or other mineral additive(s) may comprise from about 0% to about 30% of the total lost circulation material by mass.

An optional component of the lost circulation material is a substance such as clay or starch with a high water absorbance and swelling capacity. An example is a granular absorbent such as Fullers Earth or Montmorillonite clay, with mean diameter of 33 microns and mean pore diameter of 30-70 nanometers, sold by Oil-Dri Corporation of America. This optional component may comprise from about 0% to about 10% of the total lost circulation material by mass.

Another optional component is an oil to enhance lubricity, such as used cooking oil, used or residual motor oil, or other used or residual automobile fluids. A preferred source of oil is the residual oil in used motor oil containers—especially where those same containers are used as the source of the thermoplastic polymer. The optional oil component may comprise from about 0% to about 12% of the total lost circulation material by mass.

A further optional component is an additive selected from the group consisting of stearic acid, organo-titanates (e.g., Ken-React LICA 09), maleated ethylenes, maleic anhydride, styrene/ethylene-butylenes/styrene triblock copolymer (SEBS), ethylene/propylene/diene terpolymer (EPDM), ethylene/octene copolymer (EOR), ethylene/methyl acrylate copolymer (EMA), ethylene/butyl acrylate/glycidyl methacrylate copolymer (EBA-GMA), Surlyn ionomers, Maleated ethylene/propylene elastomers (EPR-g-MAs), talc, resilient graphitic carbon, heat stabilizers, and other additives. This optional additive may comprise from about 0% to about 12% of the total lost circulation material by mass.

The novel lost circulation materials are not merely mixtures of the several components. Rather, they are composites of the components. (Simple mixtures may also be present, in addition to the composites, although it is preferred to use composites alone.) The composites may be prepared through techniques otherwise known in the art for making composite materials. One such method is melt compounding, for example using intermesh, counter/co-rotating twin-screw extruders. The materials in the formulation are metered and fed to the extruder at an appropriate temperature. The extrudates are preferably quenched in a cold water bath or in air; and then may be pelletized or ground into granules of suitable sizes. Another technique is to make a blend with a high-speed kinetic mixer (e.g., a mixer manufactured by LEX Technologies, Brampton, Ontario, Canada and supplied by EcoLEX, Inc of Burlington, Ontario), followed by grinding to produce desired particle sizes.

A blend combining both common and engineering polymers (e.g., HDPE/PET) may be manufactured through a novel two-step compounding process. A first extrusion is conducted at a higher temperature (i.e., a temperature that will melt the engineering polymer) to create a matrix with combined common (e.g., HDPE) and engineering polymers (e.g., PET, nylon). A second extrusion will occur at a lower temperature (i.e., a temperature that melts the common polymer but not the engineering polymer), at which point the cellulosic fiber is also added to the blend, avoiding or minimizing thermal degradation to the fibers. For example, during the first step recycled HDPE, recycled PET, and any additives are compounded through extrusion at about 250-270° C. In a second step, cellulosic fibers are added to the HDPE-PET-additive mixture at about 160-180° C. in a second extrusion. The PET remains in the solid state during the second, cooler extrusion. The extrudates are quenched in a cold water bath, or they are air-cooled, and then they are pelletized into granules.

The novel lost circulation material may be used together with other additives known in the art to form oil-based, water-based, or synthetic oil-based drilling fluids; or they may be used with other well fluids such as cements, spacer fluids, completion fluids, and workover fluids. Examples of other additives include, for example, viscosifying agents, filtrate reducing agents, weighting agents, and cements. The novel lost circulation materials are preferably used in the fluid at a concentration level between ~2 ppb (pound per barrel) and ~50 ppb. (Note 2 pound per barrel≈5.7 g/L; 50 pound per barrel≈143 g/L.)

The composites used as lost circulation materials in the present invention may be purpose-made. Alternatively, they may be formed by crushing or grinding composite materials that contain suitable components, and that may have originally been manufactured for a different purpose, e.g., building materials such as wood-polymer composites, particleboard, fiberboard, and other types of engineered wood. Wastes may be used for this purpose (e.g., sawdust or scraps), or older materials may be recycled for use in the invention, rather than being discarded.

Optionally, a lost circulation material in accordance with the present invention may be combined with other lost circulation materials known in the art, such as cellulosic fibers, calcium carbonate, crump rubber particles, graphite, thermosets, thermoplastics, or clay.

The material may be used as a pretreatment to inhibit differential sticking, seepage, or both. It is preferred to add a concentration between about 2.0 ppb (pound per barrel) to about 6.0 ppb to the entire drilling fluid system. Sweeps at a concentration of about 5.0 ppb to about 15.0 ppb may be pumped to inhibit seepage while drilling through specific geological zones. The concentrations and volume of sweeps may be adjusted as needed. Hourly additions may be made or adjusted if seepage occurs. If lost circulation occurs, then the material may be added at a higher rate until losses stop, e.g., 20-35 ppb. (Note 2 ppb≈5.7 g/L; 6 ppb≈17.2 g/L; etc.)

Aqueous fluid for water-based drilling fluids may, for example, be selected from fresh water, sea water, brine, water-soluble organic compounds, and mixtures of the above.

Natural or synthetic oil to form an oil or synthetic-based fluid may, for example, be selected from diesel oil, mineral oil, polyolefin, polydiorganosiloxanes, ester-based oils, and mixture of the above.

MODES FOR CARRYING OUT THE INVENTION

Example 1

Thermoplastic Cellulosic-Fiber Blend One

Thermoplastic cellulosic-fiber blend one (TCB1) was made from recycled, film-grade, low-density polyethylene (38% by mass), 20-mesh wood pine fiber from American Wood Fiber Company, Madison, Wis. (40% by mass), precipitated calcium carbonate (Domino Sugar Corp., Chalmette, La.) with a mean diameter of about 20 microns (20% by mass), and 2% by mass blending agents (maleated polyethylene, PE-g-MA, G-2608, Eastman Chemical Company, Kingsport, Tenn.). Compounding was performed with a counter-rotating, twin screw extruder, CTSE-V/MARKII (C.W. Brabender Instruments Inc., South Gackensack, N.J., USA), operated at 50 rpm at a temperature profile along the length of the extruder barrel of 140, 160, 170, and 170° C. The extrudates were quenched in a cold water bath and were then granulated into particulate form.

Example 2

Thermoplastic Cellulosic-Fiber Blend Two

Thermoplastic cellulosic-fiber blend two (TCB2) was made from recycled, high-density polyethylene from used motor oil containers with about 6% residual motor oil (by mass of the polymer). The HDPE with residual oil comprised about 43% of the total mixture by mass, and was mixed with 20-mesh wood pine fiber from American Wood Fiber Company (45% by mass), precipitated calcium carbonate with a mean diameter of 20 microns (10% by mass), and 2% by mass blending agents (maleated polyethylene, PE-g-MA, G-2608). The mixed materials were compounded through a Micro-27 extruder from American Leistritz Extruder Corporation (Somerville, N.J., USA) with a temperature profile, along the length of the extruder barrel from the feeding zone to the die, of 130-160-160-170-180-180-180-180-180-180-180° C. and a screw rotating speed of 100 rpm. The extrudates were quenched in a cold water bath and then granulated into particulate form.

Example 3

Thermoplastic Cellulosic-Fiber Blend Three

Thermoplastic cellulosic-fiber blend three (TCB3) was made from mixed recycled high-density polyethylene (25% by mass—the mixture contained equal amounts of fractional melt high density polyethylene, and crate high density polyethylene, but no residual oil), 8-mesh wood pine fiber from American Wood Fiber Company, Madison, Wis. (50% by mass), calcium carbonate (23% by mass), and 2% by mass blending agents (maleated polyethylene, PE-g-MA, G-2608). The mixed materials were compounded through the Micro-27 extruder with a temperature profile of 130-150-160-170-180-180-180-180-180-180° C. and a screw rotating speed of 100 rpm. The extrudates were cooled in air and then granulated into particulate form.

Example 4

Thermoplastic Cellulosic-Fiber Blend Four

Thermoplastic cellulosic-fiber blend four (TCB4) was made from mixed recycled polyethylene (25% by mass—the polymer mix contained two parts fractional melt high density polyethylene, one part linear low density polyethylene, and one part crate high density polyethylene, without residual oil), southern pine wood shavings from a wood planer (50% by mass), and calcium carbonate (25% by mass). The materials were compounded through two Bausano MD72 and Bausano MD90 counter-rotating parallel twin-screw extrusion machines arranged in tandem. The polymers and calcium carbonate were melt blended with the MD90 at 180° C. and a screw speed of 70 RPM, and the wood fiber was added downstream from the side to the melt using the MD72. The extrudates were cooled in air and then granulated into particulate form.

Example 5

Thermoplastic Cellulosic-Fiber Blend Five

Thermoplastic cellulosic-fiber blend five (TCB5) was made from recycled PET, recycled HDPE, wood fiber, and other additives in a two-step extrusion process. The first extrusion was conducted at high temperature to create an HDPE/PET matrix, and the second extrusion added wood fiber to the blend, while avoiding thermal degradation to the fibers. For the first extrusion, HDPE, PET, and E-GMA (bonding agent) were tumble-mixed, then melt-blended, and then extruded in a Micro 27 co-rotating twin screw extruder. The extrusion temperature profile along the length of the extruder barrels was 130, 160, 190, 250, 270, 270, 270, 260, 260, and 250° C., high enough to melt the PET. The screw's rotational speed was fixed at 150 rpm. The extruded strands were drawn by a pelletizer, and cooled in a cold water bath before being pelletized. The HDPE/PET ratio was fixed at 75/25 (w/w). Based on the total weight of HDPE and PET, the loading level of the E-GMA bonding agent was 1.0% by mass. In the second extrusion, pellets produced by the first extrusion were melt-blended with dried wood flour, and then extruded with the same Micro 27 extruder using a temperature profile of 130, 150, 160, 170, 180, 180, 170, 170, 160, and 160° C. (i.e., a typical temperature profile for HDPE/wood composites). Wood flour was fed downstream by a side feeder operated at 100 rpm. The extruder screw itself was set at a speed of 150 rpm. The wood flour-to-polymer matrix ratio was 40/60 (w/w). Maleated polyethylene (PE-g-MA, G-2608, 1% total weight of fiber and polymer) was added during the second extrusion to help bond wood fibers to the polymer matrix. The extruded material was cooled in a water bath, and was then cut into pellets.

Examples 6-10

Characterization of Mechanical Properties of TCB1 through TCB5

Two 40-gram samples of each of TCB1 through TCB5, prepared as described above, were compression-molded at 170° C. into two 4 inch×6 inch×0.2 inch specimens, from which test samples were cut to test the composites' properties. Flexural properties of the composite samples were measured according to ASTM D790-03 using an Instron™ 5582 Testing Machine (Instron Co., Grove City, Pa., USA). A Tinius™ 92T impact tester (Testing Machine Company, Horsham, Pa.) was used for the Izod impact test. All samples were notched at the center point of one longitudinal side according to ASTM D256. Material rebound after 20% compression was measured using the INSTRON 5582 machine and a digital caliper by determining sample thickness both before and after compression. Results are shown in TABLE 1.

TABLE 1

| Blend Type | Base Polymer | Density (g/cm$^3$) | Young's Modulus (GPa) | Bending Strength (MPa) | Impact Strength (KJ/m$^2$) | Rebound rate after 20% Compression (%) |
|---|---|---|---|---|---|---|
| TCB1 | Recycled-LDPE | 1.20 | 1.99 | 21.01 | 3.53 | 19.9 |
| TCB2 | Recycled-HDPE | 1.07 | 1.68 | 20.06 | 2.83 | 20.6 |
| TCB3 | Recycled-Mixed-HDPE | 1.25 | 1.45 | 14.15 | 2.73 | 23.3 |

TABLE 1-continued

| Blend Type | Base Polymer | Density (g/cm³) | Young's Modulus (GPa) | Bending Strength (MPa) | Impact Strength (KJ/m²) | Rebound rate after 20% Compression (%) |
|---|---|---|---|---|---|---|
| TCB4 | Recycled-Mixed-HDPE | 1.13 | 1.39 | 29.80 | 3.05 | 21.8 |
| TCB5 | Recycled-HDPE/PET | 1.15 | 2.80 | 60.0 | 2.80 | 35.0 |

Examples 11-15

Particle Size Distribution

Extruded TCB3 and TCB4 materials were granulated with an industrial granulator using a USA standard 8-mesh screen. The material was then screened using USA standard testing sieves and a Ro-Tap shaker. The sieves were assembled with smaller mesh number screens on top. A sample of 200 g was screened each time. After screening, material retained on each screen was collected and weighed to the nearest 0.01 gram using an analytical balance. The particle size distribution (PSD) was determined from measured weight data. The PSDs for TCB3 and TCB4 listed in Table 2.

TABLE 2

| Particle Size Category | | Particle Size Distribution Granulated with a 8-mesh Screen | | Particle Size Distribution Recombined with Different Particles | | |
|---|---|---|---|---|---|---|
| Mesh | μm | PSD-TCB3 | PSD-TCB4 | PSD-S1 | PSD-S2 | PSD-S3 |
| 200 | 74 | 0.00 | 2.67 | 0.70 | 0.70 | 0.00 |
| 100 | 149 | 8.36 | 12.59 | 3.55 | 1.56 | 0.00 |
| 60 | 250 | 18.69 | 34.30 | 17.35 | 3.37 | 1.30 |
| 40 | 420 | 51.55 | 60.55 | 40.35 | 10.90 | 5.30 |
| 20 | 840 | 81.03 | 77.56 | 70.60 | 36.03 | 18.55 |
| 16 | 1190 | 98.17 | 92.86 | 91.00 | 63.82 | 37.50 |
| 12 | 1680 | 99.43 | 98.43 | 100.00 | 84.92 | 62.50 |
| 8 | 2380 | 100.00 | 100.00 | 100.00 | 97.49 | 85.00 |
| 6 | 3360 | 100.00 | 100.00 | 100.00 | 100.00 | 97.50 |
| 4 | 4760 | 100.00 | 100.00 | 100.00 | 100.00 | 100.00 |

It is generally preferred to select the PSD range for compatibility with the natural heterogeneity encountered in a particular formation. There are various guidelines commonly used in the industry to choose a PSD to form an efficient external filter cake and to minimize formation damage. For example, "Abram's rule" states that the median particle size of the bridging material should be equal to or slightly greater than one third of the median pore size of the formation. "Hand's rule" states that the D90 (the size x for which 90% of the particles by weight are smaller than size x) of the PSD should be equal to the pore size of the formation. Different PSDs for the composites of this invention can be selected by appropriate choice of grinding parameters, and of the mesh sizes used for screening the TCB particles. TABLE 2 shows three formulated PSDs formed from TCB3 material, targeted for median crack sizes of 0.04, 0.08, and 0.12 inches (PSD-S1, PSD-S2, and PSD-S3 respectively). PSD-S2 and PSD-S3 were shifted to larger particle sizes as compared with PSD-S1. Additional PSDs can be formed by appropriate combinations of different TCB compositions or particles. Other materials (e.g., calcium carbonate, cellulosic fibers, graphite, etc.) can also be added to the TCBs to form desired PSDs for given formations. (Note: 0.04 inch≈1 mm; 0.08 inch≈2 mm; 0.12 inch≈3 mm.)

Examples 16-23

Water-Based Mud Applications

A water-based mud was prepared with water, caustic soda, sodium bentonite (GEL), lignite, polyanionic cellulose (PC), and rev dust. A typical formulation comprised 2 gallons of water, 5.44 grams of caustic soda, 432.00 grams of GEL, 21.56 grams of lignite, 10.76 grams of PC, and 108.00 grams of Rev dust, yielding a mud cup viscosity of 38 seconds. Mud viscosity was adjusted using additional gels.

This formulated mud, with differing viscosities, was used to test the performance of the TCB lost circulation materials using a permeability plugging apparatus (PPA). (1) A 350 ml sample of mud with a particular mud cup viscosity level (e.g., 52 seconds) was taken from a large, well-mixed mud bucket. (2) A portion of LCM (either 20, 15, 10, or 5 gram) was combined with the 350 ml sample of mud. (3) The prepared LCM was blended for five minutes with the 350 ml mud sample with a variable speed mixer. (4) The mud with LCM was then poured into the PPA cylinder, and an aluminum disc with a 0.04 inch by 2.0 inch slot was inserted. (Note: 0.04 inch×2.0 inch≈1 mm×5 cm) (5) The PPA lid was secured on the PPA cylinder. (6) The PPA assembly was placed inside an insulated chamber with heating and temperature control systems, and a hydraulic line was attached. (7) A pressure of 500 psi was applied with the top mud exit port closed. (8) After reaching the 500 psi pressure, the exit port was opened and a timer was started, and the pressure was ramped up to 1000 psi. (9) The amount of mud lost to the "initial spurt" was recorded at the time when the pressure initially reached 1000 psi (t=0). (10) The pressure of 1000 psi was maintained for 30 minutes, and the fluid loss was recorded at 7.5, 15, and 30 minutes. (11) At the end of 30 minutes, the pressure was increased to break the seal and the maximum pressure was recorded. (Note: 500 psi≈3.45 MPa; 1000 psi≈6.89 MPa.)

"Wood bullets" (WB) from Prolog Inc. (New Iberia, La.) were also tested at the same four loading levels (20, 15, 10, and 5 grams material/350 ml mud), using otherwise identical procedures.

Tables 3 and 4 list the PPA test data for both the TCBs and the wood bullets. The TCB material showed much higher sealing ability with water-based muds. At low loading levels, the pure wood material either failed or had large filtration losses, especially at low mud viscosity levels. The novel TCB material, by contrast, could be used successfully at reduced loading levels (as low as 5 grams per 350 ml mud≈5 ppb). The use of lower loading levels allows better performance with reduced material, transportation, and handling costs.

TABLE 3

| Mud cup viscosity (second) | LCM loading per 350 ml mud (grams) | Spurt Loss (ml) | Filtration Loss (ml) | | | Max. Breaking Pressure (psi) |
|---|---|---|---|---|---|---|
| | | | 7.5 min. | 15 min. | 30 min. | |
| 52 | 20 | 58.4 | 60.4 | 60.4 | 60.4 | 1800 |
| | 15 | 38.4 | 54.4 | 66.4 | 78.4 | 1700 |
| | 10 | 36.4 | 46.4 | 84.4 | 84.4 | 1800 |
| | 5 | 35.6 | 37.6 | 37.6 | 37.6 | 1500 |
| 54 | 20 | 102.4 | 106.4 | 106.4 | 107.4 | 2000 |
| | 15 | 39.4 | 39.4 | 43.4 | 44.4 | 1800 |
| | 10 | 20.4 | 20.4 | 22.4 | 22.4 | 1900 |
| | 5 | 21.2 | 21.2 | 23.2 | 23.2 | 2000 |
| 57 | 20 | 84.4 | 88.4 | 88.4 | 90.4 | 1900 |
| | 15 | 42.4 | 64.4 | 64.4 | 64.4 | 1700 |
| | 10 | 21.6 | 23.6 | 23.6 | 25.6 | 1500 |
| | 5 | 36.0 | 42.0 | 52.0 | 52 | 1500 |
| 60 | 20 | 6.4 | 7.2 | 7.2 | 7.6 | 2000 |
| | 15 | 8.0 | 8.0 | 8.0 | 8.4 | 1900 |
| | 10 | 6.4 | 7.2 | 8.4 | 9.2 | 1900 |
| | 5 | 14.2 | 29.2 | 34.2 | 34.2 | 1900 |
| 64 | 20 | 7.2 | 7.2 | 7.2 | 7.2 | 1900 |
| | 15 | 8.4 | 8.4 | 8.4 | 8.4 | 1900 |
| | 10 | 9.6 | 9.6 | 9.6 | 10.4 | 1700 |
| | 5 | 34.4 | 36.4 | 42.4 | 44.4 | 1500 |

(Note:
1000 psi ≈ 6.89 MPa)

TABLE 4

| Mud cup viscosity (second) | LCM loading per 350 ml mud (grams) | Spurt Loss (ml) | Filtration Loss (ml) | | | Max. Breaking Pressure (psi) |
|---|---|---|---|---|---|---|
| | | | 7.5 min. | 15 min. | 30 min. | |
| 52 | 20 | 94.4 | 114.4 | 114.4 | 114.4 | 1900 |
| | 15 | 70.4 | 98.4 | 104.4 | 104.4 | 1700 |
| | 10 | FAILED | | | | 0 |
| | 5 | FAILED | | | | 0 |
| 54 | 20 | 40.4 | 40.4 | 58.4 | 62.4 | 1800 |
| | 15 | 68.4 | 72.4 | 74.4 | 74.4 | 1500 |
| | 10 | 80.4 | 82.4 | 82.4 | 84.4 | 1800 |
| | 5 | FAILED | | | | 0 |
| 57 | 20 | 19.6 | 21.6 | 21.6 | 23.6 | 1900 |
| | 15 | 84.4 | 86.4 | 86.4 | 110.4 | 1800 |
| | 10 | 94.4 | 101.4 | 101.4 | 103.4 | 1800 |
| | 5 | 158.4 | 332.4 | 334.4 | 336.4 | 1700 |
| 60 | 20 | 9.0 | 14.0 | 14.0 | 14.0 | 1900 |
| | 15 | 30.0 | 30.0 | 30.0 | 30.0 | 1900 |
| | 10 | 44.4 | 56.4 | 56.4 | 56.4 | 2000 |
| | 5 | 64.4 | 98.4 | 102.4 | 102.4 | 1700 |
| 64 | 20 | 12.4 | 12.4 | 12.4 | 15.4 | 2100 |
| | 15 | 10.4 | 10.4 | 10.4 | 10.4 | 1900 |
| | 10 | 24.4 | 29.4 | 30.4 | 30.4 | 1900 |
| | 5 | 68.4 | 84.4 | 84.4 | 84.4 | 1700 |

(Note:
1000 psi ≈ 6.89 MPa)

The PPA test was also run with TCB4 at a 10-gram per 350 mL (i.e., 10 ppb) loading level with an aluminum, multi-opening slot disc, otherwise following the procedure described above. The spurt loss was 2.4 ml. Filtration losses at 7.5, 15, and 30 minutes were 2.80, 4.40, and 4.40 ml, respectively, with a maximum seal breaking pressure of ~4,000 psi, indicating that the TCB material had a strong and rapid sealing ability. (Note: 4000 psi≈28 MPa)

Examples 24-27

Electrical Stability in Synthetic Mud

The novel LCM was tested in a commercially-available, synthetic mud containing calcium chloride, alkenes, barium sulfate, crystalline silica, cristobalite, crystalline silica, tridymite, and quartz. Basic mud properties were measured with a Baroid viscosity tester with a Fann thermo cup and a Fann 23D electrical stability tester, including: oil/water ratio=72/28; mud weight=13.3 PPG; plastic viscosity (PV) at 600 RPM/120° F.=98; plastic viscosity (PV) at 300 RPM/120° F.=56; PV/yield point=42/14; gel strength at 120° F. (3 sec)=7; gel strength at 120° F. (10 min)=16; and electric stability=463 volts. (Note: 120° F.≈49° C.)

Electrical stability was measured using 350 ml mud in combination with different TCB materials (10 grams each). Table 5 shows the electrical stability data (mean value of 10 data points, with standard deviation shown in the parentheses). The data suggested no adverse effects of the TCB material on the electrical stability of synthetic mud.

TABLE 5

| | System | | | |
|---|---|---|---|---|
| | Mud (350 ml) | Mud (350 ml) + TCB2 (10 g) | Mud (350 ml) + TCB3 (10 g) | Mud (350 ml) + TCB4 (10 g) |
| Electrical Stability (volts) | 463.67 (10.65) | 457.67 (17.81) | 458.00 (17.16) | 462.00 (13.04) |

Examples 28-34

Testing in Synthetic Mud

The synthetic mud was used to test the performance of the TCB lost circulation material using the permeability plugging apparatus (PPA) and an aluminum disc with a single 0.04 inch by 2.0 inch slot following the procedures otherwise described above for the water-based mud. (Note: 0.04 inch×2.0 inch≈1 mm×5.1 cm) Pure TCB3 material at 15, 10, and 5.0-gram loading levels, or a combination of TCB3 (5 grams) and wood bullets (5 grams) were tested in 350 ml mud. PSD-S1 (as shown in Table 2) was used for the TCB3 material at each loading level. For comparison purposes, wood bullets at a 10-gram loading level, and commercial LCM (graphite) at 20, 15, and 10-gram loading levels were also tested with 350 ml mud.

Results are shown in Table 6. TCB3 (alone or in combination with wood bullets) worked well with the synthetic mud in controlling the filtration loss, as compared to pure wood bullets or commercial LCMs. The commercial, graphite-containing LCM had smaller particle sizes, leading to large filtration losses even at the 20-gram loading level (20 ppb).

TABLE 6

| LCM Type | LCM Loading (grams) | Spurt Loss (ml) | Filtration Loss (ml) | | | Max. Breaking Pressure (psi) |
|---|---|---|---|---|---|---|
| | | | 7.5 min. | 15 min. | 30 min. | |
| TCB3 | 15.0 | 2.4 | 2.4 | 2.4 | 8.4 | 1600 |
| | 10.0 | 3.6 | 13.6 | 17.6 | 25.6 | 1500 |
| | 5.0 | 21.4 | 46.4 | 50.4 | 66.4 | 1500 |
| TCB3 + WB | 5.0/5.0 | 5.6 | 7.6 | 10.6 | 13.6 | 2000 |
| WB | 10.0 | 17.4 | 35.2 | 39.2 | 41.2 | 2200 |
| Commercial LCM (Graphite-based) | 20 | 68.4 | 70.8 | 70.8 | 70.8 | 1500 |
| | 15 | 136.4 | 136.4 | 136.4 | 136.4 | 1500 |
| | 10 | 194.4 | 244.4 | 284.4 | 294.4 | 0.0 |

(Note: 1000 psi ≈ 6.89 MPa)

Tests were also made at two temperature levels (120° F. and 250° F.). Combined samples of TCB4 and wood bullets at various loading levels were blended with 350 ml mud, as otherwise described above. The PPA cylinder was heated to the target temperature (120° F. or 250° F.) prior to testing. The combined sample of TCB4 (5 grams) and wood bullets (WB-5 grams) led to almost a complete seal of the slot at 120° F. Increasing the temperature to 250° F. led to some increased filtration loss. Increasing the TCB4 loading from 5 to 10 grams significantly reduced the filtration loss at 250° F. The TCB performed well at elevated temperature levels. (Note: 250° F.≈121° C.)

TABLE 7

| Temp (° F.) | LCM Type | LCM Loading (grams) | Spur Loss (ml) | Filtration Loss (ml) | | | Max. Breaking Pressure (psi) |
|---|---|---|---|---|---|---|---|
| | | | | 7.5 min. | 15 min. | 30 min. | |
| 120 | TCB4 + WB | 5.0/5.0 | 2.4 | 2.4 | 2.4 | 2.4 | 2300 |
| | TCB4 + WB | 5.0/5.0 | 12.8 | 15.8 | 20.4 | 22.8 | 1900 |
| 250 | TCB4 + WB | 10.0/5.0 | 3.2 | 6.2 | 6.2 | 6.2 | 1900 |

(Note:
1000 psi ≈ 6.89 MPa)

Examples 35-40

Use in Diesel Muds

The novel LCMs were also tested with commercially-purchased diesel mud. This mud contained diesel oil, water, weight material, calcium chloride, emulsifier, lime, filtration control agent, and gellant. Basic mud properties were measured with a Baroid viscosity tester with a Fann thermo cup and a Fann 23D Electrical Stability Tester: diesel oil fraction=80%; mud weight=16.5 PPB; plastic viscosity (PV) at 600 rpm/120° F.=135; Plastic viscosity (PV) at 300 rpm/120° F.=72; PV/yield point=63/9; gel strength at 120° F. (3 sec)=16; gel strength at 120° F. (10 min)=31; and electric stability=429 volts.

Electrical stability was measured using 350 ml mud combined with different TCB materials (10 grams each). Table 8 shows the electrical stability data (mean value of 10 data points with standard deviations shown in the parentheses). The data suggest that the TCB materials had no adverse effect on the electrical stability of diesel mud.

TABLE 8

| | System | | |
|---|---|---|---|
| | Mud (350 ml) | Mud (350 ml) + TCB3 (10 g) after mixing | Mud (350 ml) + TCB3 (10 g) after testing |
| Electrical Stability (volts) | 429.00 (23.38) | 429.50 (23.42) | 431.50 (21.52) |

The performance of the novel TCBs was tested in diesel mud using the PPA and an aluminum disc with a 0.04 inch by 2.0 inch slot as otherwise described above. In 350 ml diesel mud we tested TCB3 alone at 10, 7.5, and 5.0-gram loading levels; and a combination of TCB3 (5 grams) and wood bullets (2.5 grams). The PSD-S1 distribution of the TCB3 material was used at each loading level. For comparison purposes, a commercial graphite-based LCM was also tested at a loading level of 10 grams LCM in 350 ml mud.

Results are shown in Table 9. TCB3, alone or in combination with wood bullets, worked well in controlling filtration loss in diesel mud. The commercial graphite LCM had smaller particle sizes, allowing large filtration loss.

TABLE 9

| LCM Type | LCM Loading (grams) | Spurt Loss (ml) | Filtration Loss (ml) | | | Max. Breaking Pressure (psi) |
|---|---|---|---|---|---|---|
| | | | 7.5 min. | 15 min. | 30 min. | |
| TCB3 | 10.0 | 2.4 | 3.6 | 3.6 | 3.6 | 2000 |
| | 7.5 | 10.6 | 12.6 | 12.6 | 12.6 | 1800 |
| | 5.0 | 30.4 | 53.4 | 62.4 | 62.4 | 1800 |
| TCB3 + WB | 5.0/2.5 | 7.2 | 10.2 | 10.2 | 10.2 | 2000 |
| Commercial LCM (Graphite-based) | 10.0 | 141.2 | 141.2 | 141.2 | 141.2 | 1500 |

(Note:
1000 psi ≈ 6.89 MPa)

Example 41

Using a Commercial Wood-Plastic Composite as a Raw Material

An alternative embodiment of the invention used as a raw material a commercial wood-plastic composite (viz., a composite sold for use as a building material). A sample of a commercial wood plastic composite (WPC) blend made of 40% polymer (20% virgin HDPE and 20% recycled LDPE), 55% wood fiber, and 5% processing agents and colorant was selected. The material was re-melted and compounded with 20% precipitated calcium carbonate (based on total WPC blend weight) using a counter-rotating twin screw extruder (CTSE-V/MARKII from C.W. Brabender Instruments Inc., South Gackensack, N.J., USA) at 170° C. The extruded material was water-cooled, granulated, and screened into size categories of 8, 12, 16, 20, 40, 60, 100, and 200 mesh.

The PPA test was run with the "re-compounded" commercial WPC blends at a 10-gram (10 ppb) loading level in 350 ml of 16.5 ppb diesel mud as otherwise described above. The measured initial spurt loss was 4.8 ml. Filtration losses at 7.5, 15, and 30 minutes were 4.8, 4.8, and 4.8 ml, respectively, with a maximum seal breaking pressure of 1800 psi—indicating that the material had excellent sealing ability. The data showed that reground commercial WPC material (either new or used) can be modified and used in formulating a lost circulation material. Thus the invention provides an economical avenue for recycling down-grade or rejected WPC blends, used WPC products, and WPC scraps and other waste material. (Note: 1800 psi≈12.4 MPa)

Examples 42-45

Field Tests

Cements are commonly used in subterranean well drilling, completion, and remediation. For example, in primary cementing a casing string is cemented in a well bore. A hydraulic cement is pumped into the space between the walls of the well bore and the outside of the casing string. The cement sets in the annular space and forms a sheath of hardened, impermeable cement. The hardened cement physically supports and positions the casing string in the well bore and bonds it to the walls of the well bore.

It is usually desirable that "unused" cement pumped into a well bore should be fully returned to the surface, i.e., that it should not be lost into the fractures. In a production zone, a larger drilling rig is typically replaced with a smaller production rig after successful drilling, because it generally costs much more to operate the larger rig. It is desirable to be able to set up the smaller rig quickly, and also to pump less cement by adequately sealing fractures with a lost circulation material during drilling.

A 46,000 lb load of TCB having essentially the same formulation as TCB4 was prepared using an industrial-scale extrusion machine. The extruded material was granulated and sorted with an 8-mesh screen to produce a material that was similar to PSD-S2 (described in greater detail above).

This material was tested in a commercial oil/gas well in the Ignacio Blanco field, La Plata County, Colo. A water-based drilling mud was pre-treated with a forty-pound sack of the TCB4/PSD-S2-type material every 15 minutes, at a depth corresponding to the top of a coal seam (~2,663 feet, or 812 meter). The well was drilled to a total depth of 3,549 feet or 1,082 meter without substantial loss or seepage. The operators reported that the materials were easy to handle on-site. The torque on the drill bit decreased as the TCB material was added, and no seepage was observed. Previous wells at the same general location over many years had been drilled with no treatment, or had been pre-treated with other lost circulation materials. The operators reported that these prior wells had suffered from losses or seepage, not seen with the new material.

The material was tested on another well in the Ignacio Blanco Field, La Plata, Colo. A water-based drilling fluid was pre-treated with a forty-pound sack of the PSD-S2-type material every hour while drilling through the Fruitland coal section and the Picture Cliffs formation. The well was drilled to a total depth of 3,317 feet or 1,011 meters. There was no substantial seepage or mud loss observed. Previous wells at the same general location over many years had been drilled with no treatment, or had been pre-treated with other lost circulation materials. The operators reported that these prior wells had suffered from losses or seepage, not seen with the new material.

The material was also tested in a commercial oil/gas well in the Fayetteville Shale, White County, Ark., using an oil-based mud. When seepage losses were noted, pellets of the TCB4-like material (10.0 ppb) were pumped in periodically. Seepage was successfully reduced to an acceptable level, as the hole was drilled to a total depth of 6,675 feet (2035 meters). After the casing had been run to the bottom of the hole, the cement process was initiated. Essentially full drilling fluid and cement returns were observed throughout the process. The TCB4-like material successfully sealed the fractures and enabled the cement to be pumped back to the surface as desired.

The material was tested in another commercial oil/gas well in the Fayetteville Shale, Cleburne County, Ark. When seepage losses were noted, pellets of the TCB4-like material (10.0 ppb) were pumped periodically. Seepage was reduced. At a total depth of 9,900 feet (3018 meter) full cement returns were experienced. The material was easy to identify and work with on location.

The complete disclosures of all references cited in this specification are hereby incorporated by reference. In the event of an otherwise irreconcilable conflict, however, the present specification shall control.

What is claimed:

1. A method for reducing lost circulation of a fluid in a subterranean formation; said method comprising contacting the subterranean formation with a mixture of a fluid and a lost circulation material; wherein:
    (a) the lost circulation material comprises composite particles;
    (b) the composite particles comprise at least two thermoplastic polymers and cellulosic fibers;
    (c) the thermoplastic polymers are between about 10% and about 90% of the lost circulation material by mass;
    (d) at least one of the thermoplastic polymers is a common polymer, having a melting point less than 200° C.; and at least one of the thermoplastic polymers is an engineering polymer, having a melting point between 250° C. and 270° C.;
    (e) the cellulosic fibers are between about 10% and about 80% of the lost circulation material by mass;
    (f) the thermoplastic polymers form a matrix that binds together the other components into composite particles;
    (g) the composite particles were formed by extrusion of the components or high-speed mixing of the components, followed by grinding, cutting, or pelletizing the extruded or mixed components; and (h) the composite particles have the property that, if the composite particles are allowed to absorb water, the composite particles will swell in size while maintaining rigidity.

2. A method as in claim 1, wherein the thermoplastic polymers comprise one or more polymers selected from the group consisting of acrylonitrile butadiene styrene, polymethylmethacrylate, acrylonitrile, polytetrafluoroethylene, polyvinylidene fluoride, Nylon 6, Nylon 66, polycarbonate, polybutylene terephthalate, polyethylene terephthalate, polyetheretherketone, polyetherimide, low density polyethylene, high density polyethylene, polyimide, polyphenylene oxide, polyphenylene sulfide, polypropylene, polystyrene, polysulfone, polyethersulfone, polyvinyl chloride, a starch-based polymer, polylactic acid, poly-3-hydroxybutyrate, polyamide 11, and bio-derived polyethylene.

3. A method as in claim 1, wherein the cellulosic fibers comprise one or more fibers, particles, or flakes that are selected from the group consisting of softwood, hardwood, bamboo, rattan, rice straw, wheat straw, rice husk, bagasse, cotton stalk, jute, hemp, flax, kenaf, milkweed, grass, and banana tree.

4. A method as in claim 1, wherein the lost circulation material additionally comprises one or more minerals selected from the group consisting of oyster shell, other sources of calcium carbonate, mica, talc, and ceramics.

5. A method as in claim 1, wherein the lost circulation material additionally comprises one or more water-absorbing components selected from the group consisting of clays, proteins, and starches.

6. A method as in claim 1, wherein the lost circulation material additionally comprises one or more new or used oils selected from the group consisting of cooking oil, motor oil, and other automobile fluids.

7. A method as in claim 1, wherein the lost circulation material additionally comprises one or more bonding agents selected from the group consisting of stearic acid, organotitanates, maleated ethylenes, maleic anhydride, styrene/ethylene/butylene/styrene block copolymer, ethylene/propylene/diene copolymer, ethylene/octene copolymer, ethylene/methyl acrylate copolymer, ethylene/butyl acrylate/glycidyl methacrylate copolymer, poly(ethylene-co-methacrylic acid), maleated ethylene/propylene elastomer, and talc.

8. A method as in claim 1, wherein the lost circulation material comprises a ground engineered wood-polymer composite; and wherein the ground engineered wood-polymer composite supplies some or all of the thermoplastic polymers; and wherein the ground engineered wood-polymer composite supplies some or all of the cellulosic fiber.

9. A method as in claim 1, wherein the lost circulation material comprises ground, recycled, polymeric containers of motor oil or other automotive fluid containing residual motor oil or other automotive fluid; and wherein the ground containers supply some or all of the thermoplastic polymers; and wherein the lost circulation material additionally comprises residual oil or other automotive fluid from the ground containers.

10. A method as in claim 1, wherein the particle size distribution of the lost circulation material is selected to optimize the reduction in lost circulation for the sizes of cracks and fissures characteristic of the subterranean formation.

11. A method as in claim 1, wherein the fluid comprises a water-based drilling mud.

12. A method as in claim 1, wherein the fluid comprises an oil-based drilling mud.

13. A method as in claim 1, wherein the fluid comprises a synthetic-based drilling mud.

14. A method as in claim 1, wherein the fluid comprises a material selected from the group consisting of cements, spacer fluids, completion fluids, and workover fluids.

15. A method as in claim 1, wherein the common polymer comprises high-density polyethylene or low-density polyethylene or both, wherein the cellulosic fibers comprise pine wood shavings or pine wood sawdust, wherein the lost circulation material additionally comprises between about 5% and about 30% calcium carbonate by mass, and wherein the lost circulation material additionally comprises between about 0.5% and about 2% maleated polyethylene by mass.

16. A method as in claim 1, wherein the common polymer comprises high-density polyethylene, wherein the engineering polymer comprises polyethylene terephthalate, wherein the cellulosic fibers comprise pine wood shavings or pine wood sawdust, wherein the lost circulation material additionally comprises between about 5% and about 30% calcium carbonate by mass, wherein the lost circulation material additionally comprises between about 0.5% and about 2% maleated polyethylene by mass, and wherein the lost circulation material additionally comprises between about 0.5% and about 1% ethylene-glycidyl methacrylate copolymer by mass.

17. A method as in claim 1, wherein the common polymer comprises high-density polyethylene, and wherein the engineering polymer comprises polyethylene terephthalate.

* * * * *